United States Patent
Chen (10) Patent No.: US 10,365,510 B2
(45) Date of Patent: Jul. 30, 2019

(54) METHOD FOR MANUFACTURING AN ORGANIC FUNCTIONAL LAYER IN A DISPLAY PANEL

(71) Applicant: Shenzhen China Star Optoelectronics Technology Co., Ltd., Shenzhen City (CN)

(72) Inventor: Lixuan Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 167 days.

(21) Appl. No.: 15/545,322

(22) PCT Filed: Jun. 20, 2017

(86) PCT No.: PCT/CN2017/089082
§ 371 (c)(1),
(2) Date: Jul. 21, 2017

(87) PCT Pub. No.: WO2018/214191
PCT Pub. Date: Nov. 29, 2018

(65) Prior Publication Data
US 2018/0341145 A1    Nov. 29, 2018

(30) Foreign Application Priority Data

May 23, 2017  (CN) .......................... 2017 1 0372302

(51) Int. Cl.
G02F 1/1335    (2006.01)
G02F 1/1339    (2006.01)
H01L 27/15     (2006.01)

(52) U.S. Cl.
CPC .... *G02F 1/133512* (2013.01); *G02F 1/13394* (2013.01); *G02F 2001/13396* (2013.01); *G02F 2001/13398* (2013.01)

(58) Field of Classification Search
USPC ....... 156/230, 231, 234, 235, 239, 240, 247, 156/249, 277
See application file for complete search history.

(56) References Cited

U.S. PATENT DOCUMENTS 7,972,875 B2 * 7/2011  Rogers .............. H01L 27/14643
                                                      438/21
2012/0133880 A1    5/2012  Jang
(Continued)

FOREIGN PATENT DOCUMENTS

CN       1710470 A    12/2005
CN     106019686 A    10/2016
(Continued)

*Primary Examiner* — Sing P Chan
(74) *Attorney, Agent, or Firm* — Leong C. Lei (57) ABSTRACT

The present invention provides a method for manufacturing an organic functional layer in a display panel by adhering an organic material pattern corresponding to the transfer protrusions from an organic material layer by using the transfer protrusion on a transfer head, then, the organic material pattern which is adhered by the transfer head is disposed on a receiving substrate, so as to form a patterned organic functional layer on the receiving substrate. The present invention provides a patterned organic functional layer in a display panel by a micro transfer print technology, which is capable of effectively reducing the material consumption of the organic functional layer and the production method is simple, which is capable of effectively reducing the online production cycle.

17 Claims, 4 Drawing Sheets

(56) References Cited

U.S. PATENT DOCUMENTS

2012/0160112 A1\* 6/2012 Hwang ................ B41F 17/001
  101/32
2014/0273319 A1\* 9/2014 Shieh .................... H01L 27/322
  438/27

FOREIGN PATENT DOCUMENTS

CN 106058010 A 10/2016
JP 2010147408 A 7/2010

\* cited by examiner

METHOD FOR MANUFACTURING AN ORGANIC FUNCTIONAL LAYER IN A DISPLAY PANEL

BACKGROUND OF THE INVENTION

Field of Invention

The present invention relates to the field of liquid crystal display, and more particularly to a method for manufacturing an organic functional layer in a display panel.

Description of Prior Art

With a thin body, power saving, no radiation and many other advantages, the liquid crystal displays (LCD) have been widely used. On the market, most of the liquid crystal display devices are backlight type liquid crystal display devices, which includes a liquid crystal display panels and backlight modules. In general, a liquid crystal display panel is composed of a color filter (CF) substrate, a thin film transistor (TFT) substrate, a liquid crystal (LC) sandwiched between the CF substrate and the TFT substrate, and a sealant. A thickness of the LC layer, which called a cell gap, is mainly controlled by the height of post spacers (PS) provided between the array substrate and the CF substrate, and the thickness of the LC layer has important effects to the structural parameters and the display quality of the LCD device, the LCD panel is formed immediately after aligning the CF substrate and the TFT substrate, the post spacers between the CF substrate and the TFT substrate are used for supporting and buffering to the two substrates, to maintain a predetermined cell gap and to ensure the stability of the screen display.

Presently, the large-size and high-resolution televisions are more and more favored by consumers. In large-size LCD panels, two types of post spacers are usually used, such as main post spacers (Main PS) and subsidiary spacers (Sub PS) on the CF substrate, for multiple levels buffering, to prevent a variety of brightness unevenness (Mura) or defects. Wherein a height of the main post spacers is greater than a height of the subsidiary post spacers and a number of subsidiary post spacers is greater than a number of the main post spacers, both of which need to be formed by different processes. When the LCD panel is aligned, the main post spacers will have a specific amount of compression and cell gap, and is in a compressed state, and subsidiary post spacers have no compression. When the LCD panel is subjected with a too large external force, the subsidiary post spacers are compressed, for a subsidiary support.

Figure 1:
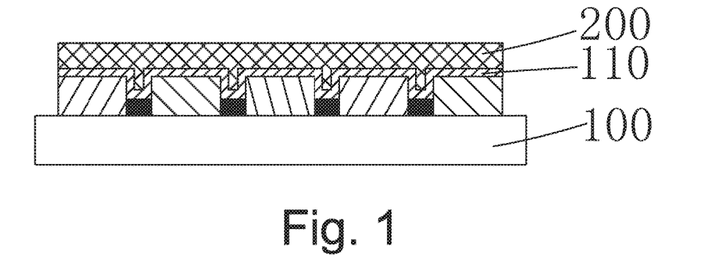
FIG. 1 is an illustrative drawing of the step S11 of a conventional manufacturing method for the post spacers.

Conventionally, the post spacers are typically formed on the CF substrate by means of a mask, photolithography, etc., and the specific manufacturing process for the post spacers generally comprises the following steps:

Step S11, as shown in FIG. 1, after the production of the indium tin oxide (ITO) layer 110 on the CF substrate 100 is completed, the CF substrate 100 is cleaned, and then, a photo-resist material for forming post spacers is coated on the cleaned CF substrate 100, to form a photo-resist layer 200.

Figure 2:
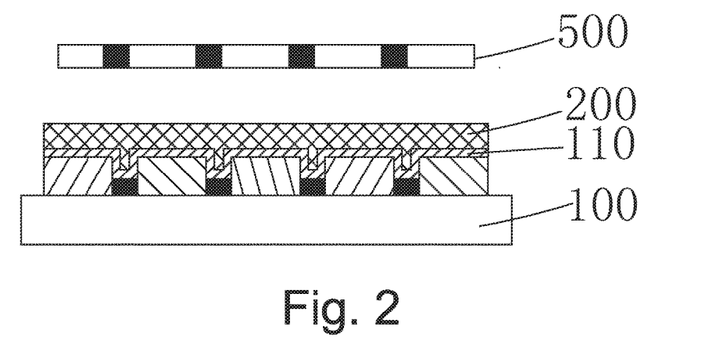
FIG. 2 is an illustrative drawing of the step S12 of a conventional manufacturing method for the post spacers.

Step S12, the photo-resist layer 200 is subjected for a vacuum drying, prebaking and cooling process as shown in FIG. 2, so that the photo-resist layer 200 is hardened; and then the photo-resist layer 200 is exposed with a mask 500.

Figure 3:
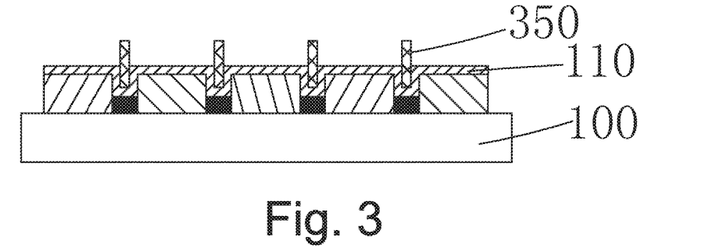
FIG. 3 is an illustrative drawing of the step S13 of a conventional manufacturing method for the post spacers.

Step 13, as shown in FIG. 3, the exposed photo-resist layer 200 is developed, and the unnecessary portion of the photo-resist layer 200 is removed by a developing process, and column-shaped post spacers 350 are obtained at fixed positions on the CF substrate 100.

In addition, for other graphic organic functional layers of the LCD display panel, such as the black matrix layer (BM) is generally formed through the mask, lithography and other processes. The material consumption is larger, the production process is cumbersome, and the cycle time is longer.

A micro LED is a device which is between a few microns to several hundred micrometers, because it is much smaller than the size of an ordinary LED, it is possible to use a single LED as a pixel for display, a micro LED display is used to complete image display with a high-density Micro LED array as a display pixel array, the same as the large-size outdoor LED display, each pixel can be addressed, be individually driven to light, can be seen as a shrink-down version of the outdoor LED display, to reduce the pixel distance from millimeter to micron. The Micro LED display and the organic light-emitting diode (OLED) display are belong to self-luminous displays, however, with comparing with OLED display, the Micro LED display has better material stability, longer life, no image mark, etc., which is considered the biggest competitor of the OLED display.

Due to the lattice matching, the Micro LED devices must grow on a sapphire-type supplying substrate by molecular beam epitaxy, then, the Micro LED bare chip is split from the supplying substrate by a laser lift-off (LLO) technology, and then transferring to a receiving substrate which has been previously prepared a complete circuit pattern by a micro transfer print (NTP) technology to form a Micro LED array, then to form a Micro LED display panel. Among them, the basic principle of micro transfer print roughly is: a patterned transfer head is used, such as a transfer head with protrusion structure of polydimethylsiloxane (PDMS), the Micro LED bare chip is absorbed with a PDMS transfer layer having viscosity, then the PDMS head is aligned with the receiving substrate, and then the Micro LED bare chip adsorbed by the PDMS carrier is attached to predetermined positions of the receiving substrate, then the PDMS transfer head is split from the receiving substrate, the transfer of the Micro LED bare chip is completed, the Micro LED array is formed.

SUMMARY OF THE INVENTION

An object of the present invention is to provide a patterned organic functional layer in a display panel by a micro transfer print technology, which is capable of effectively reducing the material consumption of the organic functional layer and effectively reducing the online production cycle.

In order to achieve the objective, the present invention provides a method for manufacturing an organic functional layer in a display panel, which comprises:

Step S1, a carrier substrate is provided and an organic material layer is coated to form on the carrier substrate.

Step S2, a transfer head is provided, transfer protrusions with a pattern is disposed on the transfer head, a side of the transfer head which is disposed with the transfer protrusions are pasted on the organic material layer. Then, the transfer head is ripped from the organic material layer, a portion of the organic material layer contacted with the transfer protrusions are adhered by the transfer protrusions, and an organic material pattern is derived.

Step S3, a receiving substrate is provided, the organic material pattern which is adhered by the transfer head is disposed on the receiving substrate. A patterned organic functional layer is formed on the receiving substrate corresponding to a pattern of the transfer protrusions.

Before the step S3, the organic material pattern which is adhered by the transfer head is disposed on the receiving substrate, the method further comprises: a bottom of the organic material pattern which is adhered by the transfer head is immersed in a bonding solvent.

In the step S3, after the organic material pattern adhering with the bonding solvent is disposed on the receiving substrate, the organic material pattern is bonded to the receiving substrate by the bonding solvent.

The organic functional layer formed in the step S3 is a post-spacing layer which has a plurality of post spacers arranged in a regular arrangement.

The post spacers of the organic functional layer formed in the step S3 are classified into main post spacers and subsidiary post spacers.

In the step S1, two kinds of organic material layers are respectively formed, the two kinds of organic material layers are used for forming the main post spacers and the subsidiary post spacers, respectively.

In the step S2, two kinds of transfer heads are provided, the transfer protrusions on the two kinds of transfer heads are the first transfer protrusions and the second transfer protrusions, respectively. Two kinds of the organic material patterns are derived, which are a first organic material pattern and a second organic material pattern being used to form the main post spacers and the subsidiary post spacers, respectively. The first organic material pattern and the second organic material pattern of the two kinds of the organic functional layers in the step S1 are respectively adhered by the first transfer protrusions and the second transfer protrusions.

A sum of heights of the second transfer protrusions and the second organic material pattern is equal to or greater than a height of the first organic material pattern. In the step S3, the second organic material pattern is disposed after the first organic material pattern is disposed on the receiving substrate; or The first organic material pattern is disposed after the second organic material pattern is disposed on the receiving substrate.

A sum of heights of the second transfer protrusions and the second organic material pattern is less than a height of the first organic material pattern. In the step S3, the first organic material pattern is disposed after the second organic material pattern is disposed on the receiving substrate.

The organic functional layer formed in the step S3 is a black matrix layer.

The organic functional layer formed by coating in the step S1 is an organic photo-resisting material.

The step S1 further comprises: an entire surface of the organic material layer is hardened through baking and/or irradiating with ultraviolet.

The transfer head is a PDMS transfer head having a PDMS film layer and the transfer protrusions belongs to the PDMS film layer. In the step S2, the organic material pattern is adhered by the transfer protrusions of the PDMS film layer.

The present invention further provides a method for manufacturing an organic functional layer in a display panel, which comprises:

Step S1, a carrier substrate is provided and an organic material layer is coated to form on the carrier substrate.

Step S2, a transfer head is provided, transfer protrusions with a pattern is disposed on the transfer head, a side of the transfer head which is disposed with the transfer protrusions are pasted on the organic material layer. Then, the transfer head is ripped from the organic material layer, a portion of the organic material layer contacted with the transfer protrusions are adhered by the transfer protrusions, and an organic material pattern is derived.

Step S3, a receiving substrate is provided, the organic material pattern which is adhered by the transfer head is disposed on the receiving substrate; a patterned organic functional layer is formed on the receiving substrate corresponding to a pattern of the transfer protrusions.

Before the step S3, the organic material pattern which is adhered by the transfer head is disposed on the receiving substrate, the method further comprises: a bottom of the organic material pattern which is adhered by the transfer head is immersed in a bonding solvent.

In the step S3, after the organic material pattern adhering with the bonding solvent is disposed on the receiving substrate, the organic material pattern is bonded to the receiving substrate by the bonding solvent.

The step S1 further comprises: an entire surface of the organic material layer is hardened through baking and/or irradiating with ultraviolet.

The beneficial effects of the present invention is: the present invention provides a method for manufacturing an organic functional layer in a display panel by adhering an organic material pattern corresponding to the transfer protrusions from an organic material layer by using the transfer protrusion on a transfer head, then, the organic material pattern which is adhered by the transfer head is disposed on a receiving substrate, so as to form a patterned organic functional layer on the receiving substrate. The present invention provides a patterned organic functional layer in a display panel by a micro transfer print technology, which is capable of effectively reducing the material consumption of the organic functional layer and the production method is simple, which is capable of effectively reducing the online production cycle.

BRIEF DESCRIPTION OF THE DRAWINGS

For better understanding the technical proposals and other beneficial effects of the present invention, please refer the following detailed description of the present invention with the accompanying drawings.

In drawings.

DETAILED DESCRIPTION OF THE PREFERRED EMBODIMENTS

The technical proposals and the effects of the present invention will be described in further detail with reference to the below preferred embodiments of the present invention and their accompanying drawings.

Figure 4:
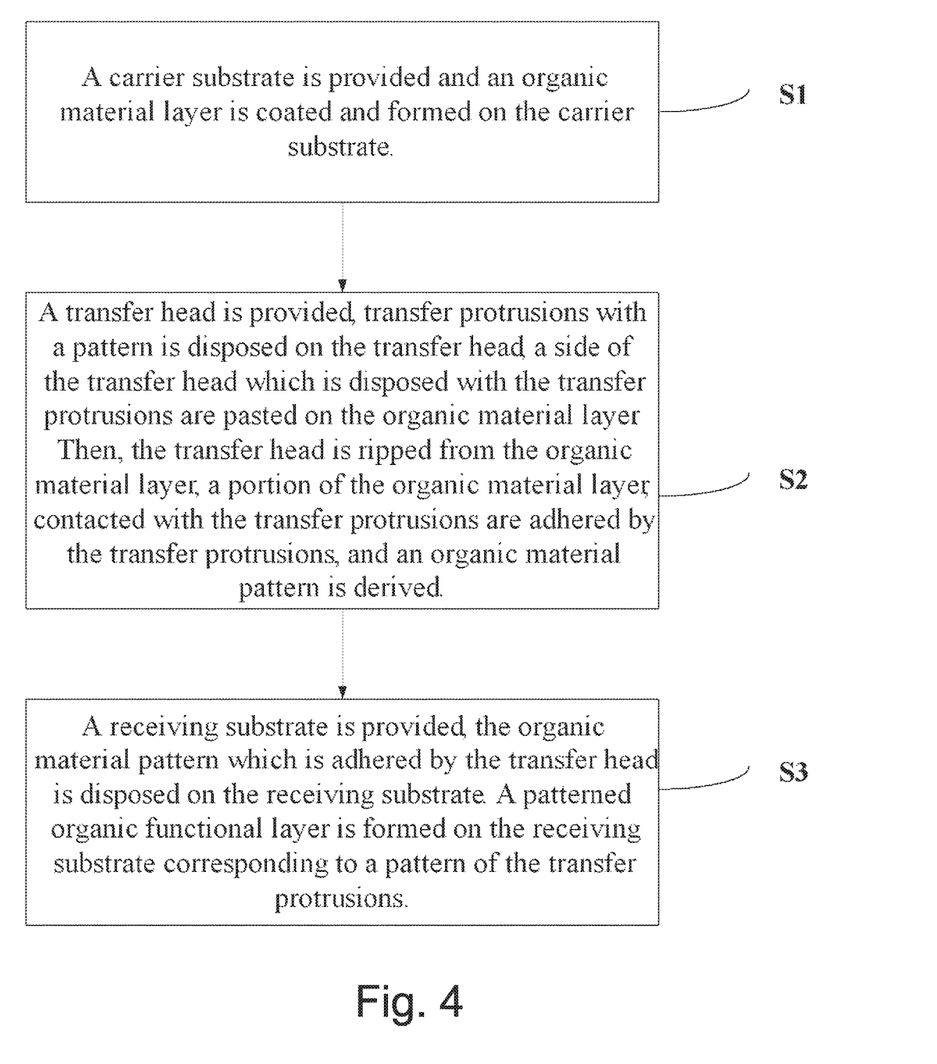
FIG. 4 is a flow diagram of a manufacturing method for an organic functional layer of a display panel according to the present invention.
Figure 5:
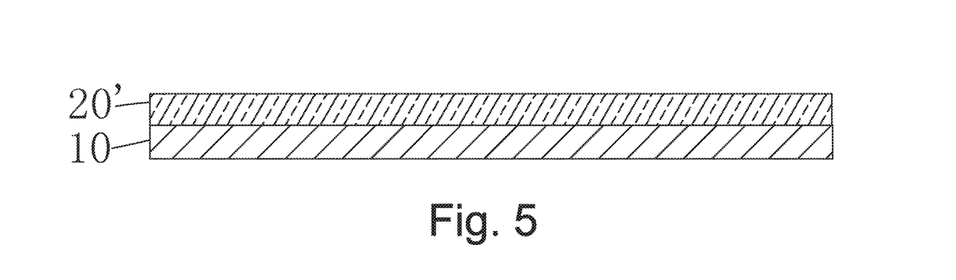
FIG. 5 is an illustrative drawing of the step S1 of the manufacturing method for an organic functional layer of a display panel according to the present invention.

Please refer to FIG. 4, which is a flow diagram of a manufacturing method for an organic functional layer of a display panel according to the present invention, which comprises:

Step S1, as shown in FIG. 5, a carrier substrate 10 is provided and an organic material layer 20' is coated to form on the carrier substrate 10. An entire surface of the organic material layer 20' is hardened through baking and/or irradiating with ultraviolet.

Figure 6:
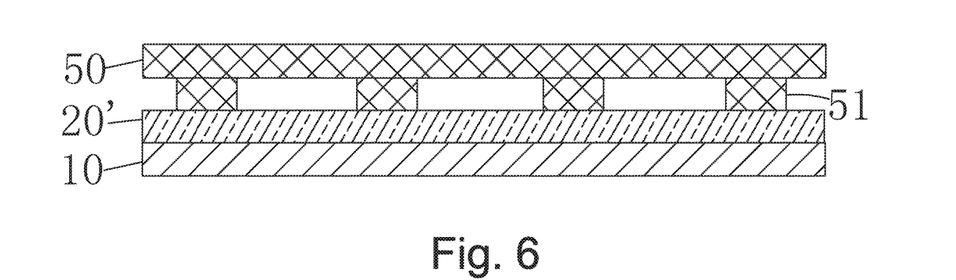
FIGS. 6-7 are an illustrative drawing of the step S2 of the manufacturing method for an organic functional layer of a display panel according to the present invention.
Figure 7:
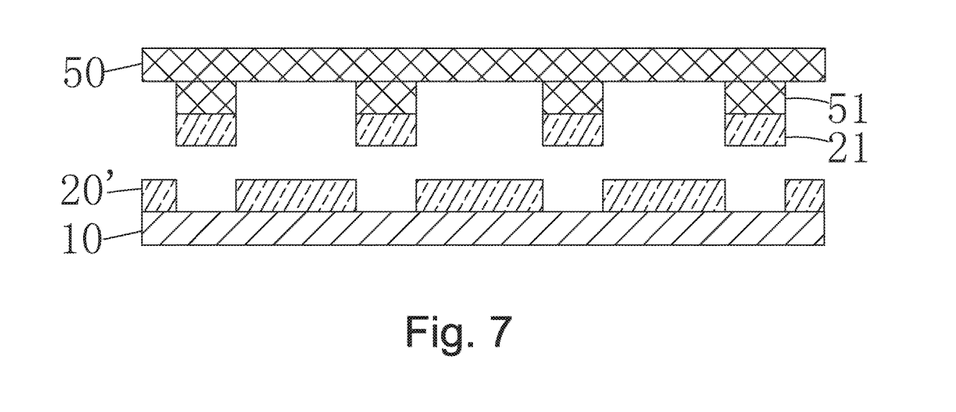

Step S2, as shown in FIG. 6-7, a transfer head 50 is provided, transfer protrusions 51 with a pattern is disposed on the transfer head 50, a side of the transfer head 50 which is disposed with the transfer protrusions 51 are pasted on the organic material layer 20'. Then, the transfer head 50 is ripped from the organic material layer 20', a portion of the organic material layer 20' contacted with the transfer protrusions 51 are adhered by the transfer protrusions 51, and an organic material pattern 21 is derived.

Specifically, the transfer head 50 is a PDMS transfer head having a PDMS film layer, and the transfer protrusions 51 belongs to the PDMS film layer. In the step S2, the organic material pattern 21 is adhered by the transfer protrusions 51 of the PDMS film layer. Besides, the transfer head 50 may also be other type of transfer head that can adhere to the organic material pattern 21.

Figure 8:
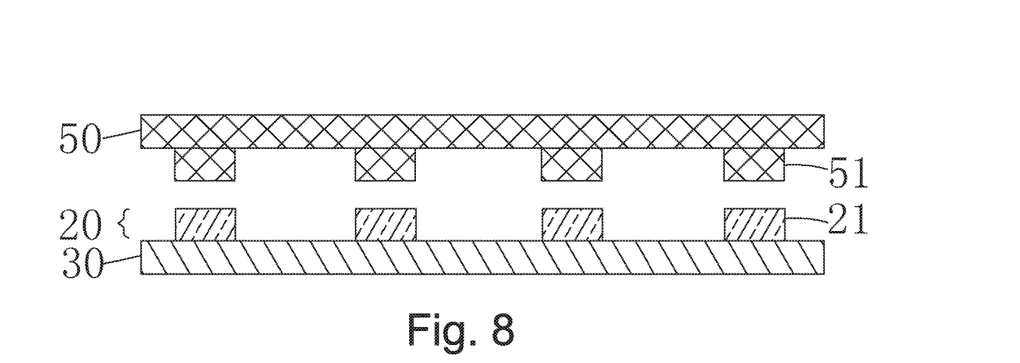
FIG. 8 is an illustrative drawing of the step S3 of the manufacturing method for an organic functional layer of a display panel according to the present invention.

Step S3, as shown in FIG. 8, a receiving substrate 30 is provided, the organic material pattern 21 which is adhered by the transfer head 50 is disposed on the receiving substrate 30. A patterned organic functional layer 20 is formed on the receiving substrate 30 corresponding to a pattern of the transfer protrusions 51.

Specifically, before the step S3, the organic material pattern 21 which is adhered by the transfer head 50 is disposed on the receiving substrate 30, the method further comprises: a bottom of the organic material pattern 21 which is adhered by the transfer head 50 is immersed in a bonding solvent. In the step S3, after the organic material pattern 21 adhering with the bonding solvent is disposed on the receiving substrate 30, the organic material pattern 21 is bonded to the receiving substrate 30 by the bonding solvent.

Specifically, in a first embodiment of the present invention, the organic functional layer 20 formed in the step S3 is a post-spacing layer which has a plurality of post spacers arranged in a regular arrangement.

Specifically, the post spacers of the organic functional layer 20 formed in the step S3 are classified into main post spacers and subsidiary post spacers. Hence, in the step S1, two kinds of organic material layers 20' are respectively formed, the two kinds of organic material layers 20' are used for forming the main post spacers and the subsidiary post spacers, respectively. Since the height Hm of the main post spacer is generally larger than the height of the subsidiary post spacer, and based on the above steps S1 to S3, it is known that the organic functional layer 20 formed in the step S3 is derived from the organic material layer 20' with the transfer protrusions 51, the height of which is dependent on the height of the corresponding organic material layer 20'.

Hence, the height of the organic material layer 20' for forming the main post spacer should be greater than the height of the organic material layer 20' for forming the subsidiary post spacer.

Correspondingly, in the step S2, two kinds of transfer heads 50 are provided, the transfer protrusions 51 on the two kinds of transfer heads 50 are the first transfer protrusions 511 and the second transfer protrusions 512, respectively. Two kinds of the organic material patterns 21 are derived, which are a first organic material pattern 211 and a second organic material pattern 212 being used to form the main post spacers and the subsidiary post spacers, respectively. The first organic material pattern 211 and the second organic material pattern 212 of the two kinds of the organic functional layers 20' in the step S1 are respectively adhered by the first transfer protrusions 511 and the second transfer protrusions 512. The height of the first organic material pattern 211 should be greater than the height of the second organic material pattern 212.

Figure 9:
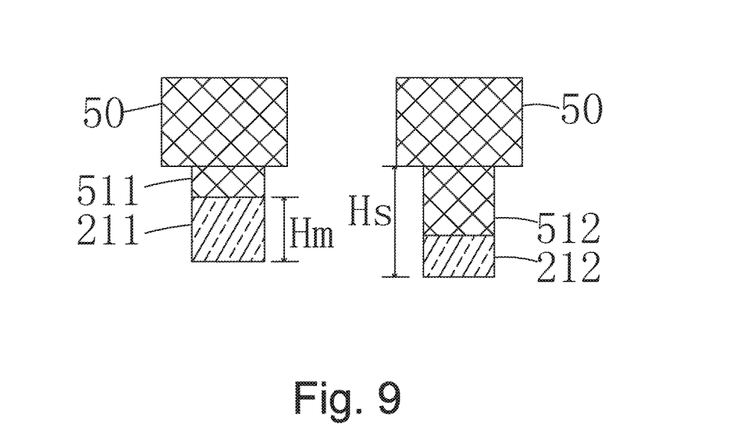
FIG. 9 is an illustrative drawing of showing a sum of heights of the second transfer protrusions and the second organic material pattern is greater than a height of the first organic material pattern of a first embodiment of the manufacturing method for an organic functional layer of a display panel according to the present invention.

Specifically, as shown in FIG. 9, when a sum of heights Hs of the second transfer protrusions 512 and the second organic material pattern 212 is equal to or greater than a height Hm of the first organic material pattern 211, the first organic material pattern 211 does not affect the placement of the second organic material pattern 212. Hence, in the step S3, the order of which the first organic material pattern 211 and the second organic material pattern 212 are placed on the receiving substrate 30 may be in any order, for example, the second organic material pattern 212 is disposed after the first organic material pattern 211 is disposed on the receiving substrate 30, or the first organic material pattern 211 is disposed after the second organic material pattern 212 is disposed on the receiving substrate 30. However, when a sum of heights of the second transfer protrusions 512 and the second organic material pattern 212 is less than a height of the first organic material pattern. In the 211, the placement of the first organic material pattern 211 prior to the placement of the second organic material pattern 212 will cause the bottom of the second organic material pattern 212 not to contact the receiving substrate 30, so in the step S3, the first organic material pattern 211 should be disposed after the second organic material pattern 212 is disposed on the receiving substrate 30.

Specifically, the organic functional layer 20' formed by coating in the step S1 is an organic photo-resisting material.

Specifically, the receiving substrate 30 provided in the step S2 may be a TFT array substrate, a color film substrate, or the like, and may be further used for a display panel such as an LCD after forming the patterned organic functional layer 20 on the receiving substrate 30. The structure of the display panel is not limited here, which may be a display panel with a conventional structure or a color filter on array (COA) type display panel, or a black matrix on array (BOA) type display panel, and the pixel structure of the display panel is not limited also, which may be a pixel structure with red, green, blue (RGB), a pixel structure with red, green, blue and white (RGBW), or a pixel structure with red, green, blue, and yellow (RGBY).

Specifically, in the first embodiment of the method for manufacturing the organic functional layer in the display panel described above, the organic functional layer is a post-spacing layer, thereby realizing the production of the post-spacing layer in the display panel. Similarly, the method for manufacturing the organic functional layer in the display panel can also be applied to the preparation of a patterned organic functional layer, such as black matrix layer, by development and solidification.

As mentioned above, the present invention provides a method for manufacturing an organic functional layer in a display panel by adhering an organic material pattern corresponding to the transfer protrusions from an organic material layer by using the transfer protrusion on a transfer head, then, the organic material pattern which is adhered by the transfer head is disposed on a receiving substrate, so as to form a patterned organic functional layer on the receiving substrate. The present invention provides a patterned organic functional layer in a display panel by a micro transfer print technology, which is capable of effectively reducing the material consumption of the organic functional layer and the production method is simple, which is capable of effectively reducing the online production cycle.

As mentioned above, those of ordinary skill in the art, without departing from the spirit and scope of the present invention, can make various kinds of modifications and variations to the present invention. Therefore, all such modifications and variations are intended to be included in the protection scope of the appended claims of the present invention.

What is claimed is:

1. A method for manufacturing an organic functional layer in a display panel, comprising:
   step S1, providing a carrier substrate, and coating to form an organic material layer on the carrier substrate;
   step S2, providing a transfer head, disposing transfer protrusions with a pattern on the transfer head, pasting a side of the transfer head which is disposed with the transfer protrusions on the organic material layer, then ripping the transfer head from the organic material layer, adhering a portion of the organic material layer contacted with the transfer protrusions by the transfer protrusions, and deriving an organic material pattern;
   step S3, providing a receiving substrate, disposing the organic material pattern which is adhered by the transfer head on the receiving substrate, forming a patterned organic functional layer on the receiving substrate corresponding to a pattern of the transfer protrusions;
   wherein before the step S3, disposing the organic material pattern which is adhered by the transfer head on the receiving substrate, further comprising: immersing a bottom of the organic material pattern which is adhered by the transfer head in a bonding solvent;
   in the step S3, after disposing the organic material pattern adhering with the bonding solvent on the receiving substrate, bonding the organic material pattern to the receiving substrate by the bonding solvent.

2. The method for manufacturing an organic functional layer in a display panel according to claim 1, wherein the organic functional layer formed in the step S3 is a post-spacing layer which has a plurality of post spacers arranged in a regular arrangement.

3. The method for manufacturing an organic functional layer in a display panel according to claim 2, wherein the post spacers of the organic functional layer formed in the step S3 are classified into main post spacers and subsidiary post spacers;
   in the step S1, respectively forming two kinds of organic material layers, the two kinds of organic material layers are used for forming the main post spacers and the subsidiary post spacers, respectively;
   in the step S2, providing two kinds of transfer heads, the transfer protrusions on the two kinds of transfer heads are the first transfer protrusions and the second transfer protrusions, respectively; deriving two kinds of the organic material patterns, which are a first organic material pattern and a second organic material pattern being used to form the main post spacers and the subsidiary post spacers, respectively; respectively adhering the first organic material pattern and the second organic material pattern of the two kinds of the organic functional layers in the step S1 by the first transfer protrusions and the second transfer protrusions.

4. The method for manufacturing an organic functional layer in a display panel according to claim 3, wherein a sum of heights of the second transfer protrusions and the second organic material pattern is equal to or greater than a height of the first organic material pattern; and in the step S3, disposing the second organic material pattern after disposing the first organic material pattern on the receiving substrate; or
   disposing the first organic material pattern after disposing the second organic material pattern on the receiving substrate.

5. The method for manufacturing an organic functional layer in a display panel according to claim 3, wherein a sum of heights of the second transfer protrusions and the second organic material pattern is less than a height of the first organic material pattern; and in the step S3, disposing the first organic material pattern after disposing the second organic material pattern on the receiving substrate.

6. The method for manufacturing an organic functional layer in a display panel according to claim 1, wherein the organic functional layer formed in the step S3 is a black matrix layer.

7. The method for manufacturing an organic functional layer in a display panel according to claim 1, wherein the organic functional layer formed by coating in the step S1 is an organic photo-resisting material.

8. The method for manufacturing an organic functional layer in a display panel according to claim 1, wherein the step S1 further comprises: hardening an entire surface of the organic material layer through baking and/or irradiating with ultraviolet.

9. The method for manufacturing an organic functional layer in a display panel according to claim 1, wherein the transfer head is a polydimethylsiloxane transfer head having a polydimethylsiloxane film layer, and the transfer protrusions belongs to the polydimethylsiloxane film layer, and in the step S2, the organic material pattern is adhered by the transfer protrusions of the polydimethylsiloxane film layer.

10. A method for manufacturing an organic functional layer in a display panel, comprising:
    step S1, providing a carrier substrate, and coating to form an organic material layer on the carrier substrate;
    step S2, providing a transfer head, disposing transfer protrusions with a pattern on the transfer head, pasting a side of the transfer head which is disposed with the transfer protrusions on the organic material layer, then ripping the transfer head from the organic material layer, adhering a portion of the organic material layer contacted with the transfer protrusions by the transfer protrusions, and deriving an organic material pattern;
    step S3, providing a receiving substrate, disposing the organic material pattern which is adhered by the transfer head on the receiving substrate, forming a patterned organic functional layer on the receiving substrate corresponding to a pattern of the transfer protrusions;
    wherein before the step S3, disposing the organic material pattern which is adhered by the transfer head on the receiving substrate, further comprising: immersing a bottom of the organic material pattern which is adhered by the transfer head in a bonding solvent;

in the step S3, after disposing the organic material pattern adhering with the bonding solvent on the receiving substrate, bonding the organic material pattern to the receiving substrate by the bonding solvent;

wherein the step S1 further comprises: hardening an entire surface of the organic material layer through baking and/or irradiating with ultraviolet.

11. The method for manufacturing an organic functional layer in a display panel according to claim 10, wherein the organic functional layer formed in the step S3 is a post-spacing layer which has a plurality of post spacers arranged in a regular arrangement.

12. The method for manufacturing an organic functional layer in a display panel according to claim 11, wherein the post spacers of the organic functional layer formed in the step S3 are classified into main post spacers and subsidiary post spacers;

in the step S1, respectively forming two kinds of organic material layers, the two kinds of organic material layers are used for forming the main post spacers and the subsidiary post spacers, respectively;

in the step S2, providing two kinds of transfer heads, the transfer protrusions on the two kinds of transfer heads are the first transfer protrusions and the second transfer protrusions, respectively; deriving two kinds of the organic material patterns, which are a first organic material pattern and a second organic material pattern being used to form the main post spacers and the subsidiary post spacers, respectively; respectively adhering the first organic material pattern and the second organic material pattern of the two kinds of the organic functional layers in the step S1 by the first transfer protrusions and the second transfer protrusions.

13. The method for manufacturing an organic functional layer in a display panel according to claim 12, wherein a sum of heights of the second transfer protrusions and the second organic material pattern is equal to or greater than a height of the first organic material pattern; and in the step S3, disposing the second organic material pattern after disposing the first organic material pattern on the receiving substrate; or disposing the first organic material pattern after disposing the second organic material pattern on the receiving substrate.

14. The method for manufacturing an organic functional layer in a display panel according to claim 12, wherein a sum of heights of the second transfer protrusions and the second organic material pattern is less than a height of the first organic material pattern; and in the step S3, disposing the first organic material pattern after disposing the second organic material pattern on the receiving substrate.

15. The method for manufacturing an organic functional layer in a display panel according to claim 10, wherein the organic functional layer formed in the step S3 is a black matrix layer.

16. The method for manufacturing an organic functional layer in a display panel according to claim 10, wherein the organic functional layer formed by coating in the step S1 is an organic photo-resisting material.

17. The method for manufacturing an organic functional layer in a display panel according to claim 10, wherein the transfer head is a polydimethylsiloxane transfer head having a polydimethylsiloxane film layer, and the transfer protrusions belongs to the polydimethylsiloxane film layer, and in the step S2, the organic material pattern is adhered by the transfer protrusions of the polydimethylsiloxane film layer.

* * * * *